Dec. 14, 1965     B. R. EVERETT ETAL     3,222,962
MULTIPLE DISC CUTTER APPARATUS
Filed March 19, 1965     2 Sheets-Sheet 1
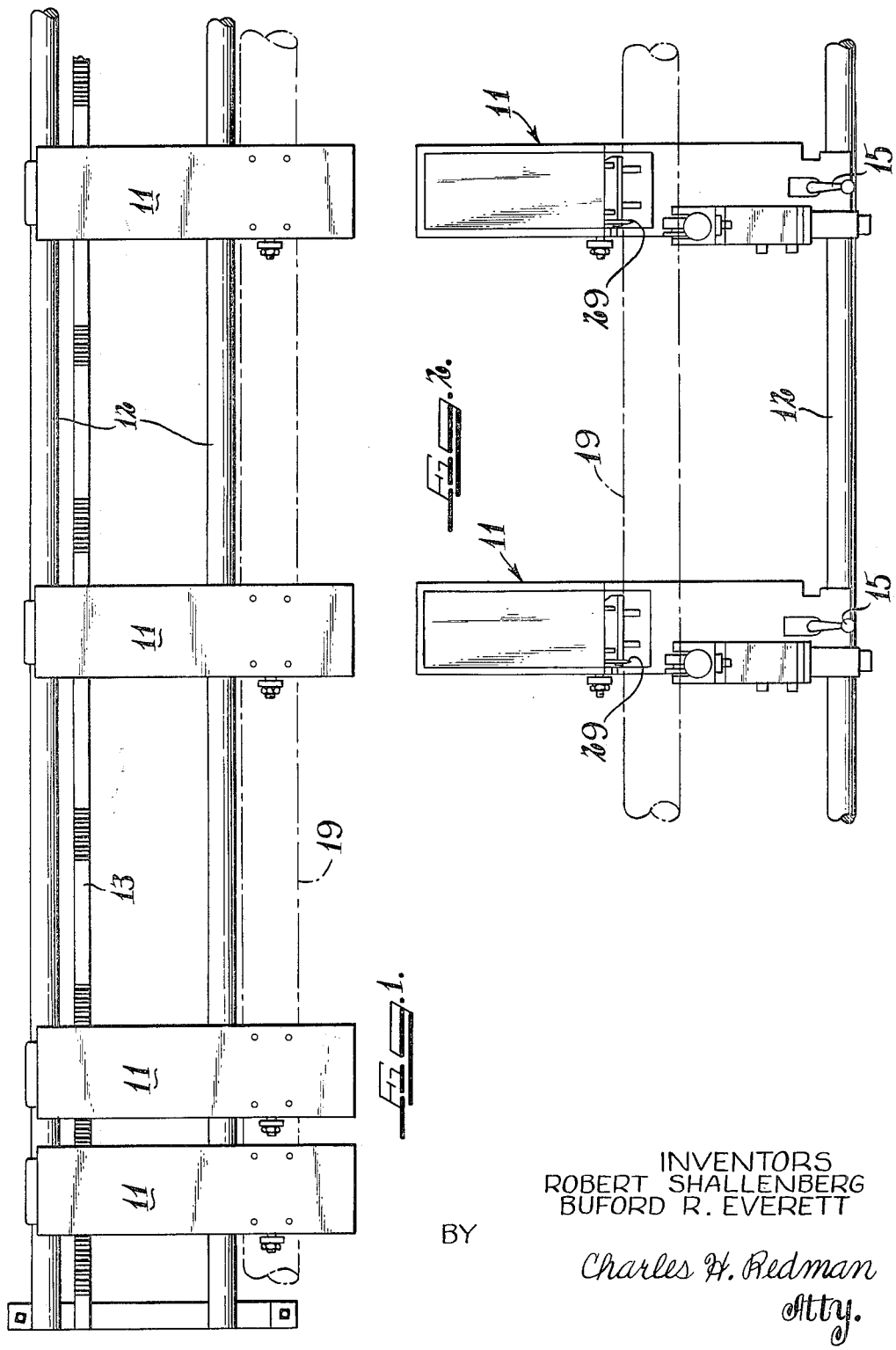
INVENTORS
ROBERT SHALLENBERG
BUFORD R. EVERETT
BY
Charles H. Redman
Atty.

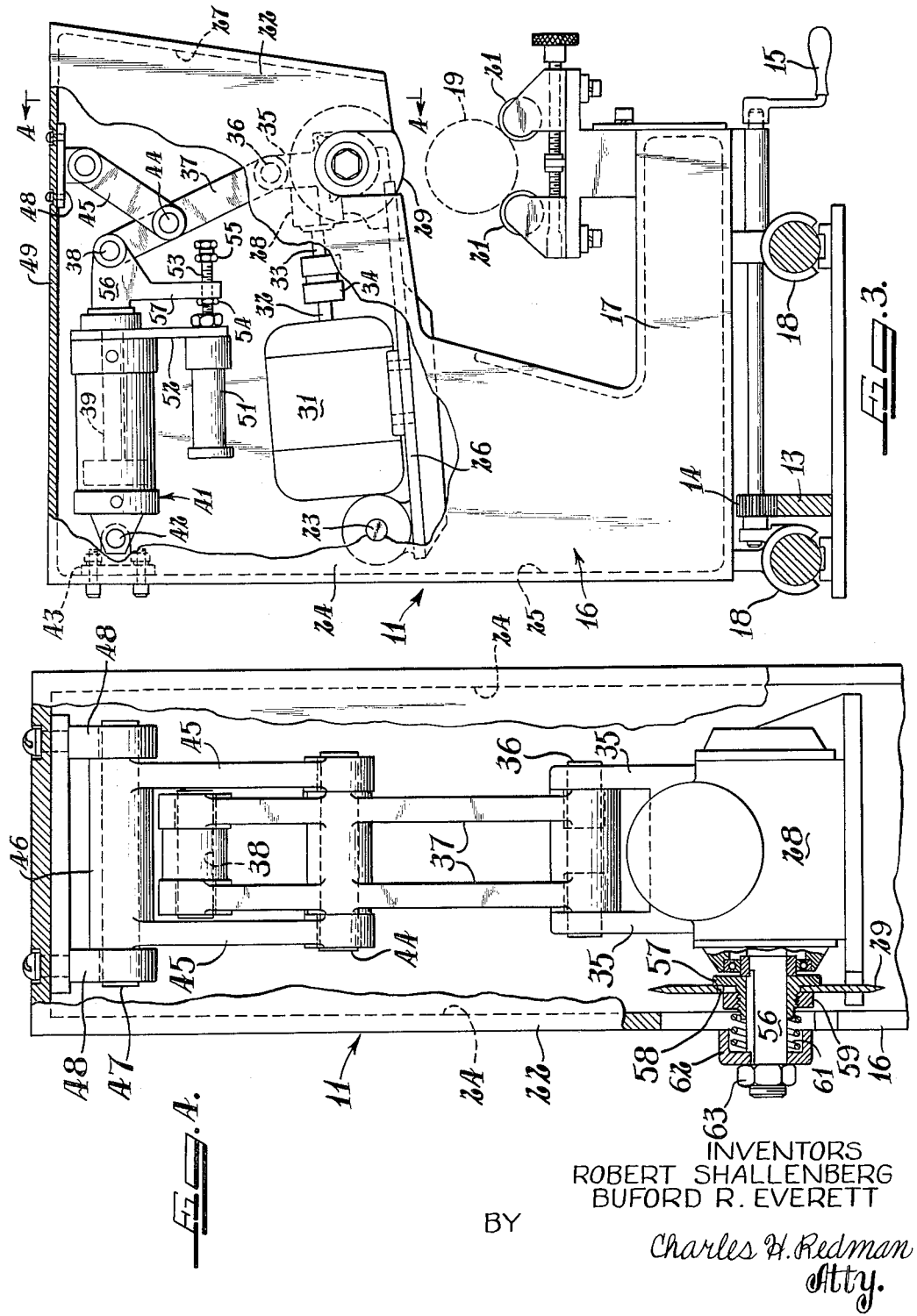

United States Patent Office 3,222,962
Patented Dec. 14, 1965

3,222,962
MULTIPLE DISC CUTTER APPARATUS
Buford R. Everett, Aurora, and Robert Shallenberg, Wheaton, Ill., assignors, by mesne assignments, to K-Line Corporation, Geneva, Ill., a corporation of Illinois
Filed Mar. 19, 1965, Ser. No. 441,267
5 Claims. (Cl. 82—83)

This application is a continuation-in-part of the application of Buford R. Everett, Serial No. 253,101, filed January 22, 1963, and now abandoned.

This application relates to improvements in machines for cutting tubular stock and the like and is more particularly concerned with a cutting machine having one or more independent cutter heads of novel construction.

Tubular stock is furnished to fabricators in sections of considerable length which are then cut into required lengths. Common practice is to feed a length of tubular stock to a circular cutter which severs a piece having the required length and wherein the stock is successively advanced into position for the cutting of additional pieces of like lengths. This is a costly, time consuming and laborious task and it is one of the advantages of the present cutting machine to provide a multitude of novel cutter heads individually adjustable on their mountings so as to be positioned for the simultaneous severing of a length of tubular stock into a plurality of pieces of the same or different lengths during one operating cycle. Heretofore, known machines provided with multiple cutter heads were inefficient in their operation primarily because no means was provided to compensate for the gradual lengthening of the tubular stock as the multiple cutting proceeded arising from accumulated tolerances. In the present disclosure, the cutter discs are yieldably mounted on the cutter heads so as to adapt them to such tolerance. Hence it is an object of the invention to provide a yieldable mounting for each cutter disc.

Known circular cutters operating to progressively advance through a work piece are advanced at a uniform rate of speed and at a uniform pressure with the result that the severed edges of the work piece develop objectionable flash or burrs and in some instances chip at the conclusion of the cutting operation. In the presently disclosed machine novel means is provided to apply maximum pressure and advancing speed to the cutter discs at the start of a cutting operation and to progressively decrease the applied pressure and speed as the end of the cutting operation is approached. This eliminates all probability of creating flash or burrs on and of chipping the edges of the severed work pieces. It is, therefore, another object of this invention to provide novel mechanism for initially effecting a maximum cutting pressure and maximum advancing speed at the start of work piece cutting and to progressively reduce the pressure and speed as the end of the cut is approached.

Another object is to provide a novel unitary mounting for the cutter disc assembly and its drive means.

Another and further object is to provide novel dashpot means to limit the distance through which the cutter blade travels during successive operations.

Still another object is to provide machine of the character referred to which is not too expensive or difficult to manufacture, is inexpensive to operate, and which may be adjusted readily and is very simple and efficient in its operation.

The structure and means by which the above noted and other advantages and objects of the invention are attained will be described in the following specification, taken in conjunction with the accompanying drawings, showing a preferred illustrative embodiment of the invention, in which:

FIG. 1 is a top plan view of a multiple head cutting machine;

FIG. 2 is a front elevational view of a portion of said machine;

FIG. 3 is a side elevational view of one of the several like cutter heads, showing portions of the housing broken away; and, FIG. 4 is an enlarged vertical sectional view of the cutter head viewed substantially along line 4—4 of FIG. 3.

Referring to the exemplary embodiment of the invention shown in the accompanying drawings, the multiple cutting machine illustrated in FIGS. 1 and 2, includes a plurality of like cutter heads 11 each mounted for adjustment longitudinally on the machine frame along a pair of rigid guide rails 12. Each cutter head 11 is complete in itself and they are alike. Any suitable means may be provided for adjusting the cutter heads 11 relative to one another, such as, for example, by providing a rack 13 on the machine frame and pinions 14 (FIG. 3) one carried by each cutter head and separately manipulatable as by means of a crank arm 15.

Each cutter head, best shown in FIGS. 3 and 4, comprises an upstanding housing 16 including a base 17 having depending therefrom a pair of yokes 18 slidably engaged one over each guide rail 12. This constitutes the sole mounting for the cutter heads and permits their being selectively moved along the guide rails for location at selected points along a length of tubular stock 19, or other work piece, supported in the cutter heads on guide rollers 21. As is well known in this art the guide rollers 21 are movable toward and away from each other to adapt them for supporting stock of different diameters.

Referring specifically to the FIGS. 3 and 4 disclosure, the cutter head housing 16 is hollow and it included at its upper end a forwardly projecting overhang 22 spaced from and disposed above the guide rollers 21. Pivotally mounted on an horizontal axis 23 between the side walls 24 of said head and adjacent to the back wall 25 thereof, is a platform 26. This platform extends forwardly from its pivot and terminates short of the overhang front wall 27. The platform mounts at said forward end a gear housing 28 which carries the cutter disc 29. The mounting of the cutter disc will be described in detail hereinafter.

Also mounted firmly on said platform 26 closely adjacent to its pivoted end is an electric motor 31 having its shaft 32 connected to a stud shaft 33 projecting from the gear housing by a coupling 34. The connection is such that the motor functions to drive the cutter disc 29.

The gear housing 28 has integral with its upper end a pair of upstanding lugs 35 apertured to receive a connector pair 36 which pivotally connects the lower end of a link 37 thereto. This link is of considerable length and has its upper end pivotally connected, as at 38, to the end of a piston rod 39 extending from and forming a part of a piston-cylinder assembly 41. The latter is pivotally journalled, as at 42, in the housing 11 by means of a bracket 43 secured firmly to the housing back wall 25.

The link 37 has pivotally connected thereto between its ends, as at 44, one end of each of a pair of links 45, the upper ends of which are joined in a hub 46 journalled by a bearing shaft 47 in bearing brackets 48 secured to and depending from the bottom surface of housing top wall 49. This link assembly constitutes a toggle link structure and when the cutter disc is in the elevated position substantially as shown in FIG. 3, the two sets of links are out of alignment. As the cutter disc is being lowered against a work piece the linkage progressively advances into an in-line position.

The precise distance through which the linkage may be moved in either direction is controlled by a dash-pot assembly comprised of a dash-pot 51 which is firmly mounted in a bracket 52 secured to the piston-cylinder assembly 41. The dash-pot includes an operating stem 53 that carries two spaced apart adjustable stop nuts 54, 55. The piston rod 39 includes a fixture 56 having a depending leg 57 that is forked or otherwise formed to receive the operating stem 53 therethrough freely. In operation, the stop nuts 54 or 55 are abutted each time the leg 57 reaches the determined distance of travel in opposite directions during operation of the toggle linkage. In this manner the distance the cutter disc is carried upwardly or downwardly is controlled by the dash-pot assembly.

During a cutting operation, the cutter disc 29 is carried downwardly initially into engagement with the tubular stock and then through the stock to sever same. It has been established that should the cutter disc progress through the stock at a uniform rate of speed and under uniform sustained pressure, there results the generation of objectionable flash and burrs on the edges of the cut, which must be removed manually before the severed lengths are suitable for further use. Also, in some instances, chipping occurs which renders the cut piece of stock unsuited for use. The toggle-link structure, herein provided for advancing the cutter disc through the stock, functions in a manner to insure maximum applied pressure and speed at the start of the cutting operation and progressively lighter applied pressure and slower speed as the end of the cutting operation is reached. To this end the novel toggle link means functions to insure a progressively decreasing rate of advance and applied pressure as the cutter disc cuts through the work piece.

Applicants have noted that during the cutting of a plurality of cuts simultaneously in a single length of tubular stock there is a normal tendency for the piece of stock to lengthen owing to pressure exerted in an axial direction on each side of the cut being made by the advancing cutter discs 29. Obviously, were no means provided to compensate for this the cutter discs, or at least some of them would jam or would effect a cut that would not be normal to the axis of the tubular stock. It is for this reason that the cutter discs are resiliently mounted on their shafts as explained hereinafter. As a result, any lengthening of the stock, however minute, is compensated for by comparable shifting of the cutter discs on and along their shafts. Clearly, the cutter disc most closely situated to the held end of the tubular stock will have minimum movement whereas those more further spaced spaced from said end will shift to an amount equal to the accumulated tolerance of all intervening cuts.

For this reason, the cutter disc 29 is resiliently secured to its drive shaft 56 for rotation therewith. As best shown in FIG. 4, the cutter disc is mounted on a hub or collar 57 having an external back-up flange carrying one or more pins 58 that project through apertures in the cutter disc to integrally connect to two when a nut 59, threaded on said hub, is tightened. The hub is fitted over the projecting end of shaft 56, and is followed by a compression spring 61 partially enclosed in a peripherally flanged washer 62 and held in tension by a nut 63 screw-threaded onto the end of said shaft. This assembly allows cutter disc 29 to shift axially on the shaft during a cutting operation to compensate for accumulated tolerance.

Although we have described a preferred embodiment of our invention, in considerable detail, it will be understood that the description thereof is intended to be illustrative, rather than restrictive, as many details of the structure may be modified or changed without departing from the spirit or scope of the invention. Accordingly, we do not desire to be restricted to the exact construction described.

What we claim and desire to secure by Letters Patent of the United States is:

1. A cutter head assembly comprising, a housing including a mounting base and a hollow head portion spaced above said base, work support means on said base, a substantially horizontal platform pivoted at one end in said hollow head portion, a cutter disc assembly mounted firmly on the other end of said platform and disposed above the work support means, an electric motor supported on and adjacent to the pivoted end of said platform, a drive connection between said motor and the cutter disc assembly, vertically arranged toggle linkage connected at one end to the cutter disc assembly and at its other end to the hollow head portion, a piston-cylinder assembly mounted in said hollow head portion, means connecting said piston-cylinder assembly with the toggle linkage operable to actuate said toggle linkage for carrying the cutter disc assembly toward and away from the support means, and a dash-pot arranged to limit movement of said toggle linkage in both directions.

2. A cutter head assembly comprising, a housing including a mounting base and a hollow head portion spaced above said base, work support means on said base, a substantially horizontal platform pivoted at one end in said hollow head portion, a cutter disc assembly mounted firmly on the other end of said platform and disposed above the work support means, an electric motor mounted on and adjacent to the pivoted end of said platform, a drive connection between said motor and the cutter disc assembly, toggle linkage connected at one end to the cutter disc assembly and at its other end to the hollow head portion, hydraulic means mounted in said hollow head portion operably connected to said toggle linkage, said hydraulic means being operable to actuate said toggle linkage for carrying the cutter disc assembly toward and away from the support means, and a dash-pot arranged to limit movement of said toggle linkage in both directions.

3. A cutter head assembly comprising, a housing having a hollow head portion including a top wall, work support means arranged below said hollow head portion, a substantially horizontal platform pivoted at one end in said hollow head portion, a cutter disc assembly mounted firmly on the other end of said platform and disposed above the work support means, an electric motor supported on and adjacent to the pivoted end of said platform, a drive connection between said motor and the cutter disc assembly, toggle linkage connected at one end to the cutter disc assembly and at its other end to the hollow head portion top wall, hydraulic means mounted in said hollow head portion, means connecting said hydraulic means with the toggle linkage operable to actuate said toggle linkage for carrying the cutter disc assembly toward and away from the support means, and adjustable stop means arranged to limit movement of said toggle linkage in both directions.

4. A cutter head assembly comprising a housing including a hollow head portion, work support means arranged below said hollow head portion, a substantially horizontal platform pivoted at one end in said hollow head portion, a cutter disc assembly mounted firmly on the other end of said platform and disposed above the work support means, an electric motor supported on and adjacent to the pivoted end of said platform, a drive connection between said motor and the cutter disc assembly toggle linkage connected at one end to the cutter disc assembly and at its other end to the hollow head portion, a piston-cylinder assembly mounted in said hollow head portion, and means connecting said piston-cylinder assembly with the toggle linkage operable to actuate said toggle linkage for carrying the cutter disc assembly toward and away from the support means.

5. A cutter head assembly comprising, a housing including a mounting base and a hollow head portion spaced above said base, work support means on said base, a substantially horizontal platform pivoted at one end in said hollow head portion, a cutter disc assembly mounted firmly on the other end of said platform and disposed above the work support means, a cutter disc carried by said assembly, said cutter disc being resiliently mounted for axial movement, an electric motor supported on and adjacent to the pivoted end of said platform, a drive connection between said motor and the cutter disc, vertically arranged toggle linkage connected at one end to the cutter disc assembly and at its other end to a fixed support, a piston-cylinder assembly mounted in said hollow head portion, and means connecting said piston-cylinder assembly with the toggle linkage operable to actuate said toggle linkage for carrying the cutter disc toward and away from the work support means.

References Cited by the Examiner

UNITED STATES PATENTS

| | | | |
|---|---|---|---|
| 505,189 | 9/1893 | Climer | 83—665 |
| 794,389 | 7/1905 | Boax | 82—83 |
| 2,239,623 | 4/1941 | Oster | 83—665 |
| 2,771,662 | 11/1956 | Ziska | 82—83 |

WILLIAM W. DYER, Jr., *Primary Examiner.*

HARRISON L. HINSON, *Examiner.*